(12) United States Patent
Vasudevan et al.

(10) Patent No.: US 10,299,123 B2
(45) Date of Patent: May 21, 2019

(54) ENTITLEMENT BASED WI-FI AUTHENTICATION

(71) Applicant: Apple Inc., Cupertino, CA (US)

(72) Inventors: Chandiramohan Vasudevan, San Jose, CA (US); Vikram B. Yerrabommanahalli, Sunnyvale, CA (US); Rafael L. Rivera-Barreto, Santa Clara, CA (US); Francisco J. Gonzalez, San Jose, CA (US); Rohan C. Malthankar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 15/446,098

(22) Filed: Mar. 1, 2017

(65) Prior Publication Data

US 2018/0063111 A1    Mar. 1, 2018

Related U.S. Application Data

(60) Provisional application No. 62/378,379, filed on Aug. 23, 2016.

(51) Int. Cl.
*H04W 12/06* (2009.01)
*H04L 29/06* (2006.01)
*H04W 88/06* (2009.01)
*H04W 88/14* (2009.01)

(52) U.S. Cl.
CPC ............. *H04W 12/06* (2013.01); *H04L 63/18* (2013.01); *H04W 88/06* (2013.01); *H04W 88/14* (2013.01)

(58) Field of Classification Search
CPC ........ H04L 9/32–9/3215; H04L 9/3263; H04L 63/08–63/0892; H04L 63/10–63/108; H04L 63/18; H04W 4/24; H04W 4/50; H04W 8/18–8/205; H04W 12/04; H04W 12/06; H04W 12/08; H04W 48/16; H04W 88/06; H04W 88/08; H04W 88/14
See application file for complete search history.

(56) References Cited

U.S. PATENT DOCUMENTS

| | | | |
|---|---|---|---|
| 8,594,628 B1 * | 11/2013 | Schroeder | H04W 12/06 370/331 |
| 8,824,372 B2 | 9/2014 | Hoggan et al. | |
| 9,009,221 B2 | 4/2015 | Theado et al. | |
| 2006/0236105 A1 * | 10/2006 | Brok | H04W 12/06 713/169 |
| 2013/0024921 A1 * | 1/2013 | Gupta | H04L 63/0823 726/6 |
| 2014/0094144 A1 * | 4/2014 | Thorn | H04W 12/06 455/411 |
| 2016/0381549 A1 | 12/2016 | Lam et al. | |

* cited by examiner

*Primary Examiner* — Kevin Bechtel
(74) *Attorney, Agent, or Firm* — Meyertons Hood Kivlin Kowert & Goetzel, P.C.; Jeffrey C. Hood

(57) ABSTRACT

This disclosure relates to techniques for performing Wi-Fi authentication using an entitlement server in a wireless communication system. A wireless station may perform authentication with a carrier network entitlement server, using a protocol other than Wi-Fi. The wireless station may receive a Wi-Fi service token as part of the authentication with the carrier network entitlement server. The wireless station may perform Wi-Fi authentication with a Wi-Fi access point associated with the carrier network using the Wi-Fi service token. After performing Wi-Fi authentication using the Wi-Fi service token, the wireless station may communicate with the carrier network by way of the Wi-Fi access point.

20 Claims, 5 Drawing Sheets

ENTITLEMENT BASED WI-FI AUTHENTICATION

PRIORITY INFORMATION

This application claims priority to U.S. provisional patent application Ser. No. 62/378,379, entitled "Entitlement Based Wi-Fi Authentication," filed Aug. 23, 2016, which is hereby incorporated by reference in its entirety as though fully and completely set forth herein.

FIELD

The present application relates to wireless communications, including techniques for performing entitlement based Wi-Fi authentication in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. While some techniques for coordinating between different wireless communication technologies exist, interworking mechanisms are generally not very well developed, and so improvements in the field would be desirable.

SUMMARY

Embodiments described herein relate to systems, apparatuses, and methods for performing entitlement based Wi-Fi authentication in a wireless communication system.

Embodiments presented relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, a wireless station may perform authentication with a carrier network entitlement server. For example, the wireless station may request entitlement permission for one or more capabilities or services with respect to the carrier network. As part of the authentication with the carrier network entitlement server, the wireless device may receive a Wi-Fi service token. The authentication process may be performed over a non-Wi-Fi protocol, for example over a cellular protocol, such as LTE, LTE-A, UMTS, CDMA2000 etc. The wireless station may subsequently attempt to access the carrier network via a Wi-Fi access point deployed by the carrier network. The wireless station may utilize the Wi-Fi service token to perform authentication with the Wi-Fi access point.

In some instances, the wireless station may also or alternatively utilize a similar process including non-Wi-Fi communication with an entitlement server to obtain a Wi-Fi service renewal token, e.g., if a previously used Wi-Fi service token expires and a Wi-Fi access point associated with the carrier network requests a permanent identifier for the wireless station.

Such techniques may allow the wireless station to leverage cellular or other non-Wi-Fi based authentication procedures that the wireless device might already be performing with a carrier to also perform Wi-Fi authentication for a carrier Wi-Fi access point, potentially without providing its permanent identifier via unprotected (e.g., prior to authentication and security) Wi-Fi communication. At least according to some embodiments, this may provide improved privacy and/or security to such a wireless station.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
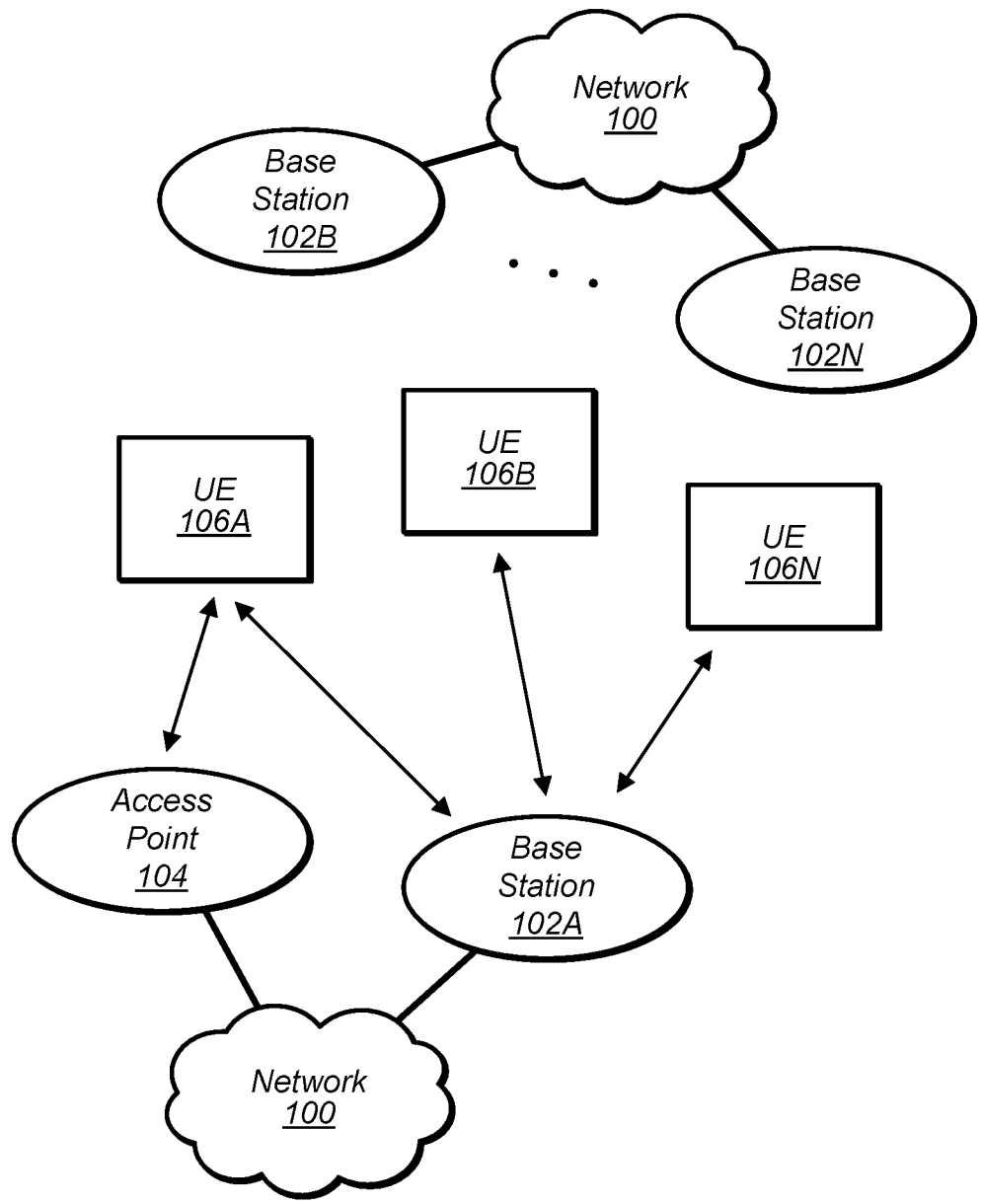
FIG. 1 illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment

AP: Access Point
BS: Base Station
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner.

For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—Wireless Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with any/all of the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1xRTT, 1xEV-DO, HRPD, eHRPD), etc.

Additionally, one or more access points (such as access point 104) may be communicatively coupled to the network 100. These may include access points configured to provide a wireless local area network (WLAN) to support cellular network offloading and/or otherwise provide wireless communication services as part of the wireless communication system illustrated in FIG. 1. Such a WLAN may be configured to operate according to any of various communications standards, such as the various IEEE 802.11 (Wi-Fi) standards.

In some cases cellular operators may implement traffic offloading and interworking mechanisms between cellular and WLAN. Using such mechanisms, cellular network operators may be able to offload part or all of a UE's cellular (e.g., LTE/UMTS) data flows to and from those cellular network operators WLAN access points. Note that in at least some instances (e.g., in order to preserve service continuity), the IP address of the WLAN interface may be the same as used for the cellular connection for cellular/WLAN interworking/offloading scenarios. For example, AP 104 might be an access point deployed by a cellular service provider to supplement their cellular network and provide the capability to offload some cellular data communications to the access point, and might also provide a connection to network 100, which might be a core network of that cellular service provider.

Base station 102A and other similar base stations (such as base stations 102B . . . 102N) and/or access points (such as access point 104) operating according to the same or a different wireless communication standard may thus be provided as a network of cells, which may provide continuous or nearly continuous overlapping service to UEs 106A-N and similar devices over a geographic area via one or more wireless communication standards.

Thus, while base station 102A may act as a "serving cell" for any/all of UEs 106A-N as illustrated in FIG. 1, each UE 106 may also be capable of receiving signals from (and possibly within communication range of) one or more other cells (which might be provided by base stations 102B-N and/or any other base stations) and/or WLANs, which may be referred to as "neighboring cells" or "neighboring WLANs" (e.g., as appropriate), and/or more generally as "neighbors". Such neighbors may also be capable of facilitating communication among user devices and/or between user devices and the network 100. Such neighbors may include "macro" cells, "micro" cells, "pico" cells, "femto" cells, WLANs, and/or cells that provide any of various other granularities of service area size. For example, base stations 102A-B illustrated in FIG. 1 might provide macro cells, base station 102N might provide a micro cell, and access point 104 might be a Wi-Fi AP, which provides a WLAN. Note also that in some instances, a UE (such as one of UEs 106A-N) may be served by multiple neighboring cells (e.g., a serving set), for example using coordinated multipoint (CoMP) wireless communication. Other configurations are also possible.

Note that a UE 106 may be capable of communicating using multiple wireless communication standards. For example, a UE 106 might be configured to communicate using two or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

Figure 5:
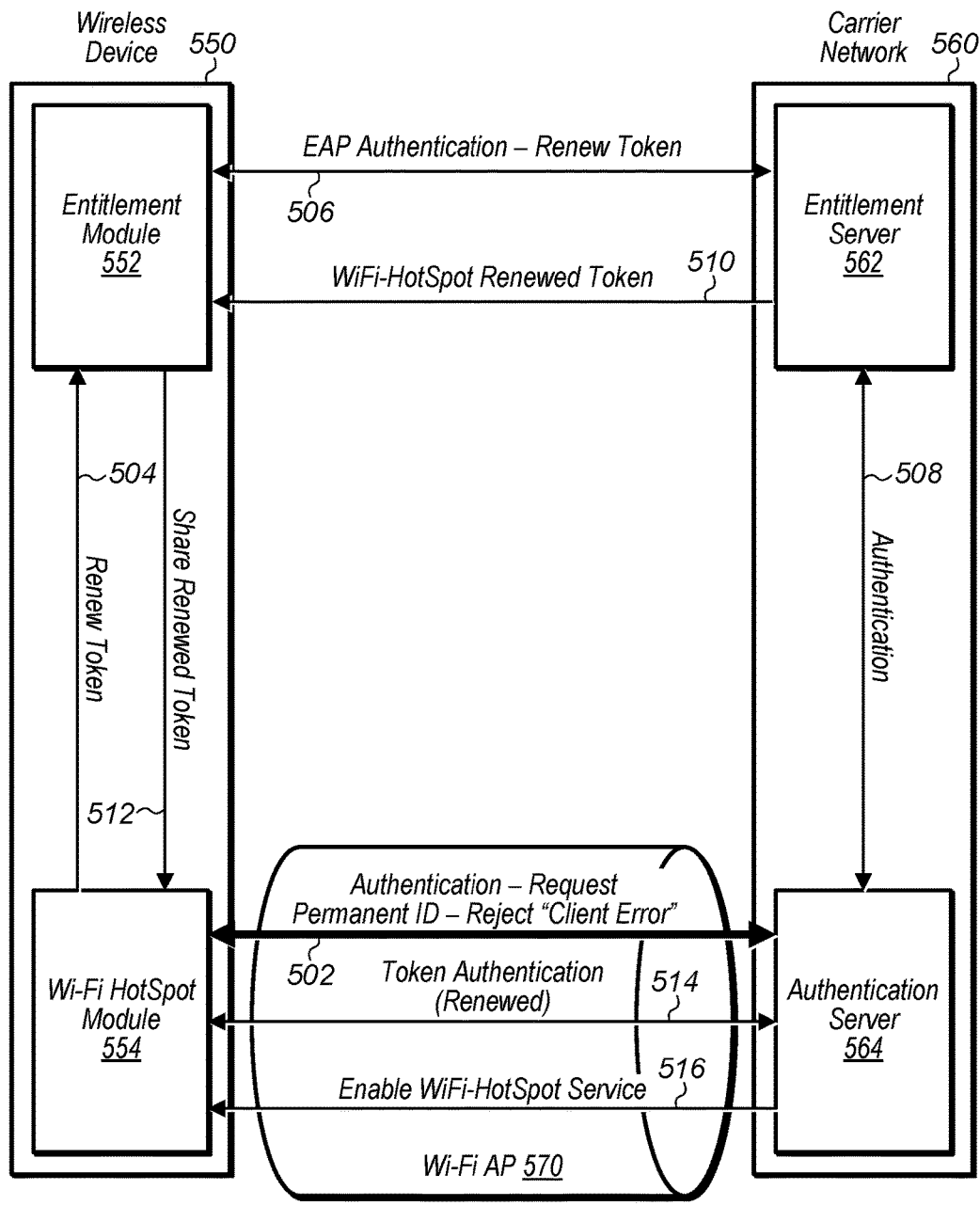
FIG. 5 illustrates an example signal flow for performing entitlement based Wi-Fi authentication renewal, according to some embodiments.

Any or all of the network 100, base stations 102, access points 104, and/or UEs 106 illustrated in FIG. 1 may be configured to implement or support implementation of part or all of the methods described herein, including, inter alia, the method of FIG. 5.

In some embodiments, as further described below, a UE 106 may be configured to perform Wi-Fi authentication for accessing a carrier network Wi-Fi access point using authentication information received from an entitlement server operated by the same carrier network.

Figure 2:
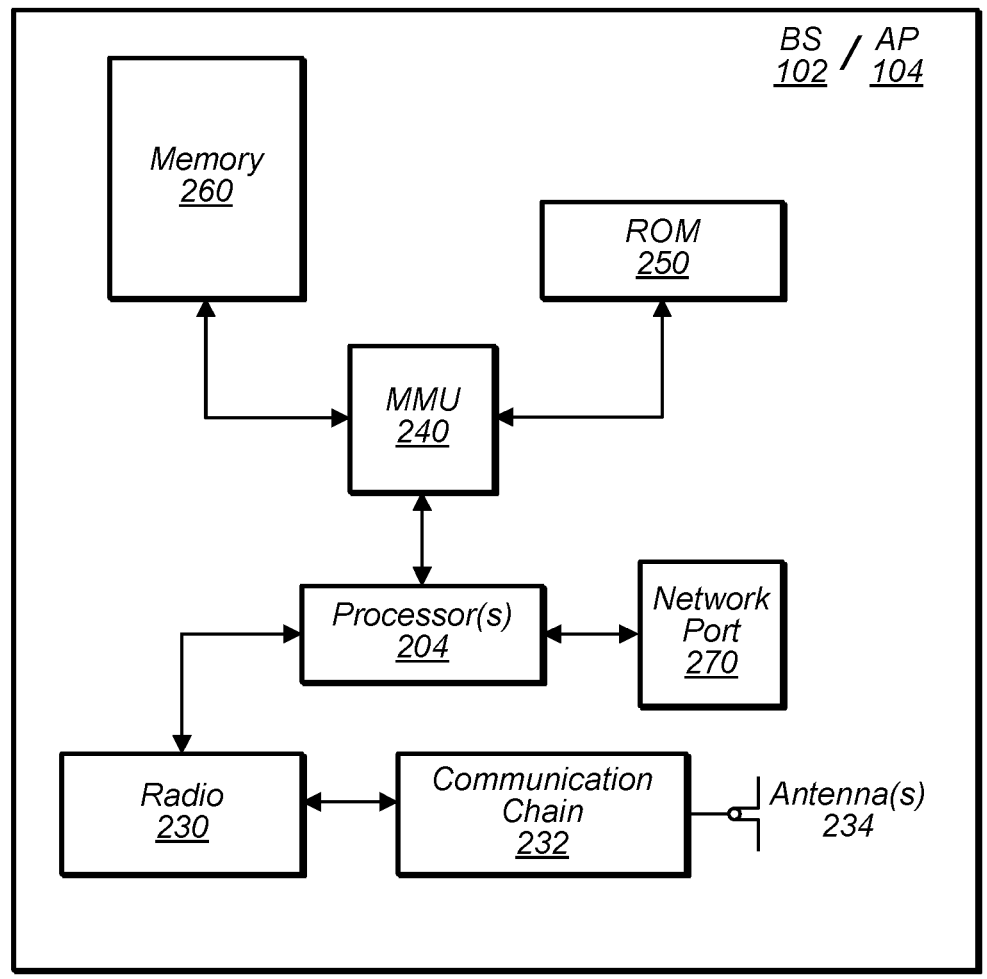
FIG. 2 illustrates an example simplified block diagram of a base station and/or access point device, according to some embodiments.

FIG. 2—Base Station/Access Point Block Diagram

FIG. 2 illustrates an example block diagram of a base station (BS) 102 or access point (AP) 104. It is noted that the block diagram of the BS/AP of FIG. 2 is only one example of a possible system. As shown, the BS/AP may include processor(s) 204, which may execute program instructions for the BS/AP. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The BS/AP may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The BS/AP may include at least one antenna 234, which may be configured to operate as a wireless transceiver and may be further configured to communicate with mobile device 106 via wireless communication circuitry 230. The antenna(s) 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11, e.g., in an AP implementation. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example in a BS implementation or in an implementation in which an AP is co-located with a BS (e.g., in case of a small cell, or in other instances when it may be desirable for the BS/AP to communicate via various different wireless communication technologies).

The BS/AP may be configured to act as an access point to provide an infrastructure mode 802.11 network to wireless stations in the vicinity of the BS/AP. Additionally or alternatively, the BS/AP may be configured to act as a peer station to perform peer-to-peer communications with nearby wireless stations. In some embodiments, as further described below, BS/AP may be configured to perform and/or support performance of methods for a wireless device to perform Wi-Fi authentication to access a carrier network Wi-Fi access point using authentication information received from an entitlement server operated by the same carrier network.

Figure 3:
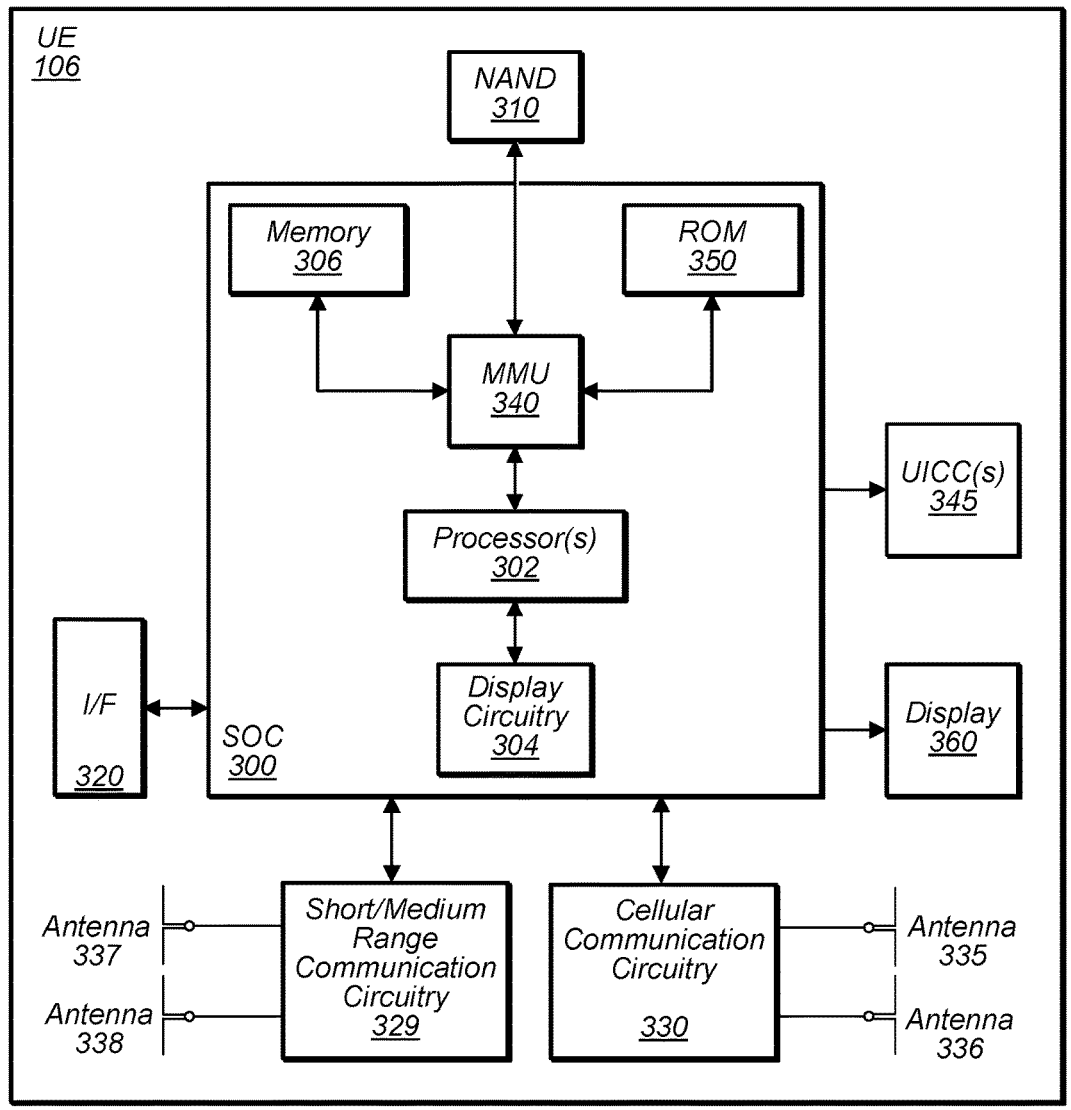
FIG. 3 illustrates an example simplified block diagram of a wireless user equipment device, according to some embodiments.

FIG. 3—UE Device Block Diagram

FIG. 3 illustrates an example simplified block diagram of a user equipment (UE) device, a mobile device or mobile station, and/or a wireless device or wireless station, which may be referred to herein as a UE 106 for simplicity. As shown, the UE 106 may include a system on chip (SOC) 300, which may include portions for various purposes. The SOC 300 may be coupled to various other circuits of the UE 106. For example, the UE 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The UE 106 may further include one or more smart cards that incorporate SIM (Subscriber Identity Module) functionality, such as one or more UICC(s) (Universal Integrated Circuit Card(s)) 345. The cellular communication circuitry 330 may couple to one or more antennas, such as antennas 335 and 336, as shown. The short to medium range wireless communication circuitry 329 may also couple to one or more antennas, such as antennas 337 and 338, as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the UE 106, and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the UE 106 may include hardware and software components for implementing the features described herein, for example including performing Wi-Fi authentication for accessing a carrier network Wi-Fi access point using authentication information received from an entitlement server operated by the same carrier network. For example, the processor 302 of the UE 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short/medium range wireless communication circuitry 329 may each include one or more processing elements. In other words, one or more processing elements may be included in cellular communication circuitry 330 and/or one or more processing elements may be included in short/medium range wireless communication circuitry 329. Thus, each of cellular communication circuitry 330 and short/medium range wireless communication circuitry 329 may include one or more integrated circuits (ICs) that are configured to perform the functions of cellular communication circuitry 330 and short/medium range wireless communication circuitry 329, respectively. In addition, each integrated circuit may include circuitry (e.g., first circuitry, second circuitry, etc.) configured to perform the functions of cellular communication circuitry 330 and short/medium range wireless communication circuitry 329.

Figure 4:
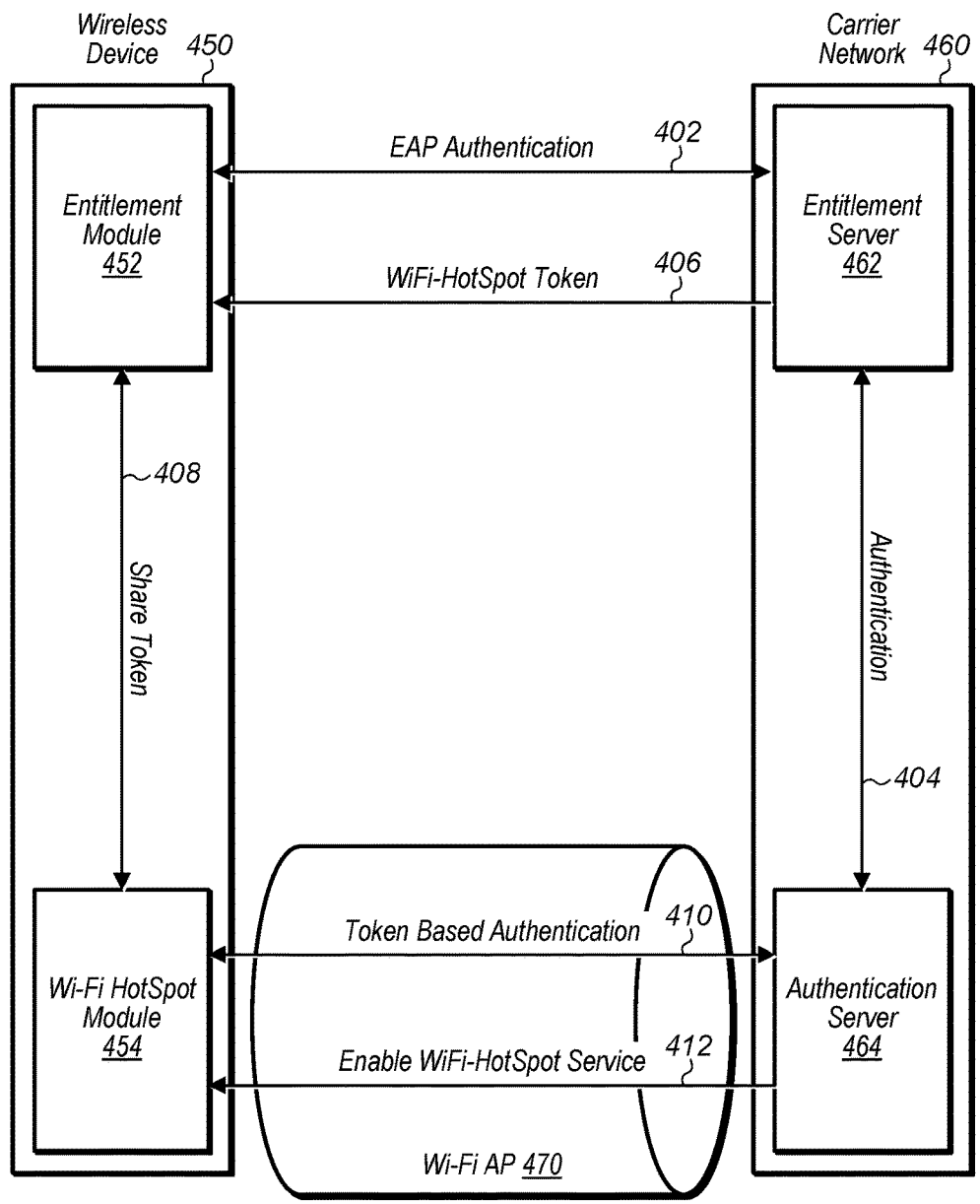
FIG. 4 illustrates an example signal flow for performing initial entitlement based Wi-Fi authentication, according to some embodiments.

FIGS. 4-5—Entitlement Based Wi-Fi Authentication

Wireless service providers ("carriers") are deploying carrier operated Wi-Fi access points, which may provide Wi-Fi "hotspots", to supplement their cellular service offerings. At least in some instances, such a carrier network may authenticate wireless devices attempting to obtain Wi-Fi access using an authentication protocol such as extensible authentication protocol (EAP) or a variant thereof. For example, EAP for subscriber identity modules (EAP-SIM) and/or EAP authentication and key agreement (EAP-AKA) techniques, which may commonly be used in cellular communication systems, may be used for network operated Wi-Fi authentication as well. Thus, it may be the case that a device performs EAP Authentication over a Wi-Fi interface when attempting to obtain access to a carrier network deployed Wi-Fi hotspot when the device has already performed the authentication with the carrier network server as part of cellular Authentication or Entitlement server access.

Some carriers may offer entitlement solutions as part of their service offerings. For example, an entitlement server may be deployed to handle entitlement requests conferring capability and/or security permissions, such as for enabling services such as Wi-Fi calling, VoLTE, etc. According to some embodiments, EAP authentication may be performed as part of entitlement requests to enable such capabilities/services. Accordingly, as part of a device performing the EAP authentication with the entitlement server, it may be possible for such EAP authentication with the entitlement server to include the assignment of a (e.g., one-time use) service token or (e.g., temporary) pseudonym for Wi-Fi access to the device. The device may present the service token or pseudonym through the Wi-Fi interface when first attempting to obtain Wi-Fi service from a Wi-Fi hotspot associated with the carrier and the network may be able to authenticate the device using the service token/pseudonym.

Performing initial Wi-Fi authentication using a token obtained through the entitlement server (or otherwise by way of cellular or other non-Wi-Fi communication) may allow for the initial Wi-Fi authentication to be performed successfully without transmitting a permanent identifier (such as an international mobile subscriber identity (IMSI)) over Wi-Fi "in the clear" (e.g., prior to authentication and security being established). This may represent a substantial improvement in security and privacy, as it may reduce the likelihood that a third party Wi-Fi access point is able to obtain the permanent ID (e.g., IMSI) of a wireless device, e.g., by representing itself as a carrier deployed access point.

FIG. 4 illustrates an example method for a wireless device to initially obtain and use a "Wi-Fi HotSpot Token" from an entitlement server, according to some embodiments. Aspects of the method of FIG. 4 may be implemented by a wireless station, a cellular base station, a Wi-Fi access point, and/or one or more cellular network nodes such as authentication and/or entitlement servers. The method shown in FIG. 4 may be used in conjunction with any of the computer systems or devices shown in the above Figures, among other devices.

Some of the method elements shown may be performed concurrently, in a different order than shown, substituted for by other elements, or may be omitted. Additional method elements may also be performed as desired. As shown, the methods may operate as follows.

As part of an initialization, such as power-up, SIM card insert, or any other such trigger, the wireless device (UE) 450 may trigger (e.g., EAP) authentication with an entitlement server 462 associated with a carrier network 460 (402). This operation could take place over any wireless interface, such as a cellular or Wi-Fi interface. However, if desired, this operation could take place preferentially or may be required to be performed over a particular wireless interface type or limited set of wireless interface types (e.g., cellular may be preferred over Wi-Fi, cellular may be required, LTE may be preferred over UMTS/GSM, etc.), for example due to security considerations, or for any of various other possible reasons. Thus, at least as one possibility, the authentication with the entitlement server may be performed by way of a cellular base station, with which the UE 450 may have established a cellular link.

The entitlement server 462 may interact with the carrier's authentication server 464 and complete the device EAP authentication, e.g., using the SIM card credentials (e.g., including IMSI and/or other permanent identifier information) of the wireless device 450 (404). Once authenticated, the entitlement server may establish one or more requested entitlements for the wireless device 450, e.g., permissions for the wireless device 450 to obtain one or more capabilities and/or services.

Further, the entitlement server 462 may send a service token for Wi-Fi hotspot service to the wireless device 450 (406). The token may be a one-time use token valid indefinitely or for a specified period of time, such as several hours, one day, etc., after which the token may expire. Alternatively, the entitlement server 462 may send to the wireless device a (e.g., temporary) pseudonym as the token, that is usable for Wi-Fi authentication with Wi-Fi hotspots associated with (e.g., operated by) the carrier network 460.

The entitlement module 452 of the wireless device 450 may provide the service token or pseudonym to a Wi-Fi hotspot module 454 of the wireless device 450, which may securely receive and save the service token (408). Alternatively or additionally, the service token or pseudonym may be stored locally at the entitlement module 452 of the wireless device 450 until needed for authentication.

Upon connecting to a Wi-Fi access point 470 associated with the carrier network 460, the wireless device's Wi-Fi hotspot module 454 may perform Wi-Fi authentication with the Wi-Fi access point 470. This may include presenting the saved token/pseudonym to an authentication server 464 associated with the carrier network 460 (410). Presentation of the token/pseudonym can be conducted through the Wi-Fi access point 470.

The authentication server 464 may (e.g., assuming the token has not yet expired) validate the token and enable Wi-Fi access by the wireless device 450 (412). According to some embodiments, the token may be a one-time use token, and the authentication server 464 may provide a (e.g., temporary) pseudonym to the wireless device 450 for obtaining Wi-Fi service subsequently.

Alternatively, if the entitlement server 462 already provided a pseudonym to the wireless device 450 (e.g., instead of a one-time use token), the wireless device 450 may present the pseudonym to the authentication server 464 as part of the Wi-Fi authentication process, and the authentication server 464 may validate the pseudonym and enable Wi-Fi access by the wireless device 450 based on the pseudonym.

Once the wireless device 450 has been authenticated, the wireless device 450 may perform Wi-Fi communication with the Wi-Fi access point 470, e.g., to access the carrier network 460 by way of the Wi-Fi access point 470 associated with the carrier network 460. The pseudonym may continue to be used by the wireless device 450 for Wi-Fi access until expiry of the pseudonym or until it is replaced with a different pseudonym, e.g., obtained through a renewal process. For example, according to some embodiments, the wireless device 450 may determine to renew its Wi-Fi service token based on an upcoming expiration time of the Wi-Fi service token, may request a Wi-Fi service renewal token, and may receive a Wi-Fi service renewal token in response to the request. As another possibility, the carrier network 460 may automatically provide a Wi-Fi service renewal token to the wireless device 450 based on an upcoming expiration time of a current Wi-Fi service token of the wireless device 450. The Wi-Fi service renewal token may be provided using the Wi-Fi interface or using a cellular or other non-Wi-Fi communication protocol, as desired.

If a pseudonym does expire or a wireless device is otherwise in a scenario in which it is attempting to obtain access to a (e.g., carrier deployed or otherwise associated) Wi-Fi access point without a valid pseudonym or service token, the wireless device may be presented with a request for its permanent identifier. FIG. 5 illustrates an example method for a wireless device 550 to renew its service token and/or pseudonym obtained by way of an entitlement server 562 associated with a carrier network 560 in such a scenario, according to some embodiments. Aspects of the method of FIG. 5 may be implemented by a wireless station, a cellular base station, a Wi-Fi access point, and/or one or more cellular network nodes such as authentication and/or entitlement servers. The method shown in FIG. 5 may be used in conjunction with any of the computer systems or devices shown in the above Figures, among other devices. Some of the method elements shown may be performed concurrently, in a different order than shown, substituted for by other elements, or may be omitted. Additional method elements may also be performed as desired. As shown, the methods may operate as follows.

As shown, the wireless device 550 may attempt to connect to a Wi-Fi access point (AP) 570, e.g., using a previously obtained temporary pseudonym. As the pseudonym may be expired, the Wi-Fi AP 570 may attempt to initiate Wi-Fi authentication for the wireless device 550 by requesting the "Permanent ID" (e.g., the IMSI of the wireless device, as one possibility) from the wireless device 550. As the wireless device 550 may not currently have a valid pseudonym or service token, and may prefer not to send its permanent ID to the AP 570 using Wi-Fi communication (e.g., at least prior to completion of authentication and security procedures when such transmission would be in the clear), for example for privacy/security reasons, the wireless device 550 may voluntarily send a "Client Error" or other similar indication that the wireless device 550 is choosing not to provide the requested permanent ID as part of the response (502).

The wireless device 550 may determine to renew its Wi-Fi service token based on this unsuccessful attempt to connect to carrier network 560 by way of the Wi-Fi AP 570, including the request for the permanent ID of the wireless device 550. To initiate this process, the Wi-Fi hotspot module 554 of the wireless device 550 may provide a request to the entitlement module 552 of the wireless device 550 to renew/obtain its Wi-Fi hotspot token/pseudonym (504).

The entitlement module 552 may perform an authentication procedure, or a procedure using existing authentication credentials, such as a "GetAuthentication" procedure, with an entitlement server 562 associated with the carrier network 560. This procedure may include providing a request to the entitlement server 562 to renew/obtain the service token or pseudonym of the wireless device 550 (506). The procedure may be performed using a protocol other than Wi-Fi, such as a cellular communication technology, at least in some embodiments.

The entitlement server 562 may interact with an authentication server 564 associated with the carrier network 560 and complete EAP authentication for the wireless device (508). For example, the SIM card credentials (and/or other security credentials, e.g., such as temporary credentials obtained via previous authentication through the entitlement server) of the wireless device 550 can be used to perform the authentication.

Upon successful authentication, the wireless device 550 may receive a new token, e.g., a "renewed" token, from the entitlement server 562 (510). Alternatively, the entitlement server 562 may send, to the wireless device 550, a pseudonym that is usable for Wi-Fi authentication with Wi-Fi access points associated with the carrier network 560 as the Wi-Fi service renewal token.

The entitlement module 552 of the wireless device 550 may provide the new (or "renewed") token to the Wi-Fi hotspot module 554 of the wireless device 550, which may securely receive and save the token (512). Alternatively or additionally, the entitlement module 552 may otherwise store the new token such that it is accessible to the Wi-Fi hotspot module 554 as needed.

Upon re-connecting to the Wi-Fi access point 570 associated with the carrier network 560, the Wi-Fi hotspot module 554 may present the new (or "renewed") token to the authentication server 564, e.g., by way of the Wi-Fi access point 570 (514). Thus, the wireless device 550 may perform Wi-Fi authentication with the Wi-Fi access point using the Wi-Fi service renewal token.

The authentication server 564 may validate the token and enable the wireless device 550 to access the Wi-Fi access point 570, e.g., and communicate with the carrier network 560 through it (516). As previously noted, the token may be a one-time use token, and the authentication server 564 may provide a (e.g., temporary) pseudonym to the wireless device 550 for obtaining Wi-Fi service based on the one-time use token. Subsequently or alternatively, if the entitlement server 562 already provided a pseudonym to the wireless device 550 (e.g., instead of a one-time use token), the wireless device 550 may present the pseudonym to the authentication server 564 as part of the Wi-Fi authentication, and the authentication server 564 may validate the pseudonym and enable Wi-Fi access by the wireless device 550 based on the pseudonym.

Thus, using the techniques described herein, a wireless device may be able to leverage prior (e.g., cellular) authentication and entitlement server communication to obtain access token/pseudonym information to facilitate Wi-Fi authentication. The wireless device may accordingly be able to avoid providing its permanent ID (e.g., IMSI) via Wi-Fi communication in the clear, when it could be more vulnerable to eavesdropping and/or other privacy violations.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a non-transitory memory medium comprising program instructions; and
a processing element operatively coupled to the non-transitory memory medium, wherein the processing element is configured to execute the program instructions to cause a wireless station to:
request to connect to a carrier network via a Wi-Fi access point associated with the carrier network;
receive, from the Wi-Fi access point, a request for an international mobile subscriber identity (IMSI) responsive to the connection request;
authenticate with a carrier network entitlement server, using a wireless communication protocol other than Wi-Fi, wherein the authentication with the carrier network entitlement server comprises receiving, at the wireless station, a Wi-Fi service token using the wireless communication protocol other than Wi-Fi;
determine a pseudonym for obtaining Wi-Fi access based on the Wi-Fi service token;
authenticate with the Wi-Fi access point, upon authentication with the carrier network entitlement server and based at least in part on the request for the IMSI, using the pseudonym and without providing the IMSI; and
communicate, upon Wi-Fi authentication, with the carrier network through the Wi-Fi access point.

2. The apparatus of claim 1,
wherein the Wi-Fi service token comprises a one-time use token.

3. The apparatus of claim 2, wherein to determine the pseudonym based on the Wi-Fi service token, the processing element is further configured to cause the wireless station to:
provide the one-time use token to the Wi-Fi access point; and
receive the pseudonym for obtaining Wi-Fi access from the Wi-Fi access point in response to providing the one-time use token.

4. The apparatus of claim 1,
wherein the Wi-Fi service token comprises the pseudonym for obtaining Wi-Fi access.

5. The apparatus of claim 1,
wherein the authentication with the carrier network entitlement server is performed by way of a cellular base station using a cellular communication technology.

6. The apparatus of claim 1,
wherein the authentication comprises extensible authentication protocol (EAP) authentication.

7. The apparatus of claim 1, wherein the processing element is further configured to cause the wireless station to:
determine to renew the Wi-Fi service token based at least in part on an expiration time of the Wi-Fi service token;
request a Wi-Fi service renewal token from the carrier network entitlement server;
receive the Wi-Fi service renewal token from the carrier network entitlement server; and
renew the Wi-Fi authentication with the Wi-Fi access point using the Wi-Fi service renewal token.

8. The apparatus of claim 1, wherein the processing element is further configured to cause the wireless station to:
receive, from the Wi-Fi access point, a request for a permanent identifier, wherein the request for the permanent identifier is received based at least in part on expiration of the Wi-Fi service token;
provide a client error indication to the Wi-Fi access point in response to the request for a permanent identifier;
request, using a protocol other than Wi-Fi, a Wi-Fi service renewal token from the carrier network entitlement server based at least in part on receiving the request for the permanent identifier;
receive the Wi-Fi service renewal token from the carrier network entitlement server; and
perform Wi-Fi authentication with the Wi-Fi access point using the Wi-Fi service renewal token.

9. A wireless station, comprising:
at least one antenna;
at least one wireless interface communicatively coupled to the at least one antenna; and
at least one processor communicatively coupled to the at least one wireless interface;
wherein the wireless station is configured to:
request to connect to a carrier network via a Wi-Fi access point, wherein the Wi-Fi access point is associated with the carrier network;
receive, from the Wi-Fi access point, a request for an international mobile subscriber identity (IMSI) of the wireless station in response to the request to connect;
authenticate with a carrier network entitlement server, using a protocol other than Wi-Fi, and request a Wi-Fi service token from the carrier network via the carrier network entitlement server;
receive the Wi-Fi service token from the entitlement server using the protocol other than Wi-Fi;
determine a pseudonym for Wi-Fi access based at least in part on the Wi-Fi service token; and
perform Wi-Fi authentication with the Wi-Fi access point using the pseudonym for Wi-Fi access and without providing the IMSI.

10. The wireless station of claim 9,
wherein requesting the Wi-Fi service token further comprises requesting the Wi-Fi service token using a cellular communication protocol.

11. The wireless station of claim 9,
wherein the authentication comprises one of:
extensible authentication protocol for subscriber identity modules (EAP-SIM) authentication; or
extensible authentication protocol authentication and key agreement (EAP-AKA) authentication.

12. The wireless station of claim 9,
wherein the Wi-Fi service token comprises one of:
the pseudonym for Wi-Fi access; or
a one-time use token.

13. The wireless station of claim 12,
wherein the Wi-Fi service token comprises a one-time use token,
wherein to determine the pseudonym for Wi-Fi access the wireless station is further configured to:
provide the one-time use token to the Wi-Fi access point; and
receive the pseudonym for obtaining Wi-Fi access from the Wi-Fi access point in response to providing the one-time use token.

14. The wireless station of claim 12,
wherein the Wi-Fi service token comprises the pseudonym.

15. The wireless station of claim 9,
wherein the wireless station is further configured to:
determine to renew the Wi-Fi service token based at least in part on an expiration time of the Wi-Fi service token;
request a Wi-Fi service renewal token from the carrier network entitlement server;
receive the Wi-Fi service renewal token from the carrier network entitlement server; and
renew the Wi-Fi authentication with the Wi-Fi access point using the Wi-Fi service renewal token.

16. A method for operating a carrier network, the method, comprising:
receiving, from a wireless station, a request to connect to the carrier network via a Wi-Fi access point associated with the carrier network;
transmitting, from the Wi-Fi access point to the wireless station, a request for an international mobile subscriber identity (IMSI) responsive to the connection request;
performing, via an entitlement server of the carrier network, authentication with the wireless station using a wireless communication protocol other than Wi-Fi, wherein the authentication comprises transmitting, to the wireless station, a Wi-Fi service token using the wireless communication protocol other than Wi-Fi;
performing, via the Wi-Fi access point, Wi-Fi authentication with the wireless station, using the pseudonym and without receiving the requested IMSI via the Wi-Fi access point; and
communicating, upon Wi-Fi authentication, with the carrier network through the Wi-Fi access point.

17. The method of claim 16,
wherein the authentication with the wireless station using a wireless communication protocol other than Wi-Fi is performed by way of a cellular base station; and
wherein the Wi-Fi service token is provided to the wireless station by way of a cellular base station.

18. The method of claim 16,
wherein the authentication with the wireless station using a wireless communication protocol other than Wi-Fi is performed using extensible authentication protocol (EAP) authentication.

19. The method of claim 16,
wherein the Wi-Fi service token comprises a one-time use token.

20. The method of claim 16,
wherein the Wi-Fi service token comprises the pseudonym.

* * * * *